US012449208B2

(12) United States Patent
Azzouz et al.

(10) Patent No.: US 12,449,208 B2
(45) Date of Patent: Oct. 21, 2025

(54) THREE-FLUID PLATE HEAT EXCHANGER

(71) Applicant: Valeo Systemes Thermiques, Le Mesnil Saint-Denis (FR)

(72) Inventors: Kamel Azzouz, Le Mesnil Saint Denis (FR); Jérémy Blandin, Le Mesnil Saint Denis (FR); Imad Chelali, Le Mesnil Saint Denis (FR); Cédric De Vaulx, Le Mesnil Saint Denis (FR); Amrid Mammeri, Le Mesnil Saint Denis (FR); Julien Tissot, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 215 days.

(21) Appl. No.: 17/784,730

(22) PCT Filed: Dec. 11, 2020

(86) PCT No.: PCT/FR2020/052397
§ 371 (c)(1),
(2) Date: Jun. 13, 2022

(87) PCT Pub. No.: WO2021/116626
PCT Pub. Date: Jun. 17, 2021

(65) Prior Publication Data
US 2023/0003458 A1 Jan. 5, 2023

(30) Foreign Application Priority Data
Dec. 13, 2019 (FR) ...................................... 1914409

(51) Int. Cl.
*F28D 9/00* (2006.01)
*F28F 3/00* (2006.01)
(Continued)

(52) U.S. Cl.
CPC .......... *F28D 9/0093* (2013.01); *F28D 9/005* (2013.01); *F28F 3/005* (2013.01)

(58) Field of Classification Search
CPC .......... F28F 3/005; F28F 2240/00; F28F 3/10; F28F 3/086; F28F 3/083; F28F 3/08;
(Continued)

(56) References Cited

U.S. PATENT DOCUMENTS 6,305,466 B1 * 10/2001 Andersson .............. F28D 9/005
165/DIG. 371
8,869,398 B2 * 10/2014 Kent ...................... B21D 53/04
29/890.03
(Continued)

FOREIGN PATENT DOCUMENTS

CN 109154474 A 1/2019
DE 102016113469 A1 2/2017
(Continued)

OTHER PUBLICATIONS

International Search Report Issued in Corresponding PCT Application No. PCT/FR2020/052397, Dated Apr. 20, 2021 (5 Pages with English Translation).
(Continued)

*Primary Examiner* — Frantz F Jules
*Assistant Examiner* — Jason N Thompson
(74) *Attorney, Agent, or Firm* — Osha Bergman Watanabe & Burton LLP

(57) ABSTRACT

Disclosed is a three-fluid heat exchanger (1) comprising a stack of plates (20a, 20b, 20c, 30a, 30b, 30c) and: a first circuit (11) for the circulation of a first heat-transfer fluid between a first inlet manifold (11a) and a first outlet manifold (11b) for the first heat-transfer fluid, a second circuit (12) for the circulation of a second heat-transfer fluid between a second inlet manifold (12a) and a second outlet
(Continued)

Figure 1:
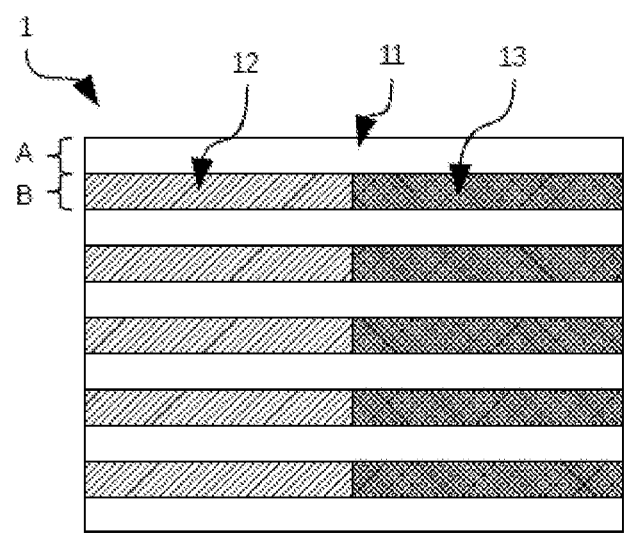

manifold (12*b*) for the second heat-transfer fluid, a third circuit (13) for the circulation of a third heat-transfer fluid between a third inlet manifold (13*a*) and a third outlet manifold (13*b*) for the third heat-transfer fluid, the stack of plates (20*a*, 20*b*, 20*c*, 30*a*, 30*b*, 30*c*) forming an alternation of first (A) and second (B) circulation spaces for the circulation of heat-transfer fluid, stacked in the direction of stacking of plates (20*a*, 20*b*, 20*c*, 30*a*, 30*b*, 30*c*), the first circuit (11) being arranged within the first circulation spaces (A) and the second (12) and third (13) circuits being jointly arranged within the second circulation spaces (B).

14 Claims, 5 Drawing Sheets

(51) Int. Cl.
    *F28F 3/04*         (2006.01)
    *F28F 3/08*         (2006.01)
    *F28F 9/02*         (2006.01)

(58) Field of Classification Search
    CPC   F28F 3/046; F28F 3/04; F28D 9/0093; F28D 9/0056; F28D 9/005; F28D 9/0043; F28D 9/0037
    USPC .......................................................... 165/140
    See application file for complete search history.

(56) References Cited

U.S. PATENT DOCUMENTS

| | | | |
|---|---|---|---|
| 2004/0159424 A1* | 8/2004 | Reinke | F28F 13/08 165/140 |
| 2011/0168362 A1* | 7/2011 | Hall | F28D 1/0426 165/121 |
| 2013/0292101 A1 | 11/2013 | Denoual | |
| 2017/0030253 A1* | 2/2017 | Tokozakura | F28D 9/005 |
| 2019/0120572 A1* | 4/2019 | Rossignol | F28D 9/0056 |
| 2023/0324128 A1* | 10/2023 | Choi | F28D 9/0093 165/140 |

FOREIGN PATENT DOCUMENTS

| | | | |
|---|---|---|---|
| WO | 2019073322 A1 | | 4/2019 |
| WO | WO-2019081994 A1 | * | 5/2019 |
| WO | 2022010313 A1 | | 1/2022 |

OTHER PUBLICATIONS

Written Opinion Issued in Corresponding PCT Application No. PCT/FR2020/052397, Dated Apr. 20, 2021 (5 Pages).

Office Action issued in corresponding CN application No. 202080093079.0, dated Dec. 30, 2024 (11 Pages).

Office Action issued in corresponding EP Application No. 20848798.3, dated Jan. 10, 2024 (4 Pages).

\* cited by examiner

THREE-FLUID PLATE HEAT EXCHANGER

The present invention relates to the field of heat exchangers and more particularly to the field of three-fluid plate heat exchangers for motor vehicles allowing heat energy to be exchanged between two distinct heat-transfer fluids and a third heat-transfer fluid.

Plate heat exchangers generally comprise a stack of plates forming various superposed circulation spaces through which the various heat-transfer fluids pass. A separate heat-transfer fluid circulates in each circulation space. A first heat-transfer fluid generally circulates in circulation spaces in alternation over the entire height of the stack of plates. The second and third heat-transfer fluids then circulate in distinct circulation spaces between two circulation spaces in which the first heat-transfer fluid circulates. The second and third heat-transfer fluids thus each circulate over part of the height of the stack of plates.

However, this type of architecture may result in the three-fluid heat exchanger being of large size, which may present a problem for integration within the motor vehicle.

One of the objects of the present invention is therefore to at least partially overcome the drawbacks of the prior art and to provide an improved three-fluid heat exchanger.

The present invention therefore relates to a three-fluid heat exchanger comprising a stack of plates and:
- a first circuit for the circulation of a first heat-transfer fluid between a first inlet manifold and a first outlet manifold for the first heat-transfer fluid,
- a second circuit for the circulation of a second heat-transfer fluid between a second inlet manifold and a second outlet manifold for the second heat-transfer fluid,
- a third circuit for the circulation of a third heat-transfer fluid between a third inlet manifold and a third outlet manifold for the third heat-transfer fluid, the stack of plates forming an alternation of first and second circulation spaces for the circulation of heat-transfer fluid, stacked in the direction of stacking of plates, the first circuit being arranged within the first circulation spaces and the second and third circuits being jointly arranged within the second circulation spaces.

According to one aspect of the invention, the first circulation circuit comprises at least two passes within one and the same first circulation space.

According to another aspect of the invention, the second and third circulation circuits each comprise at least two passes within one and the same second circulation space.

According to another aspect of the invention, within the second circulation spaces, the second and third circulation circuits are arranged side by side such that the second circulation circuit is arranged vertically in line with a first pass of the first circulation circuit and the third circulation circuit is arranged vertically in line with a second pass of the first circulation circuit.

According to another aspect of the invention, within the second circulation spaces, the second and third circulation circuits are intermeshed such that a pass of the first circulation circuit is arranged simultaneously vertically in line with a pass of the second and of the third circulation circuits.

According to another aspect of the invention, the circulation of the first heat-transfer fluid in the first circulation spaces flows countercurrent to the circulation of the second and third heat-transfer fluids in the second circulation spaces.

According to another aspect of the invention, the plates comprise at least one rib configured to define the path of the passes.

According to another aspect of the invention, each circulation space comprises a first and a second plates adjoining one another, defining said circulation space, in the stack, the second plate of a circulation space being in contact with the first plate of the adjacent circulation space and vice versa.

According to another aspect of the invention, the plates have a curved profile with lateral edges, the plates being fitted into one another, the lateral edges of two adjacent plates overlapping so as to form the circulation spaces.

Figure 2:
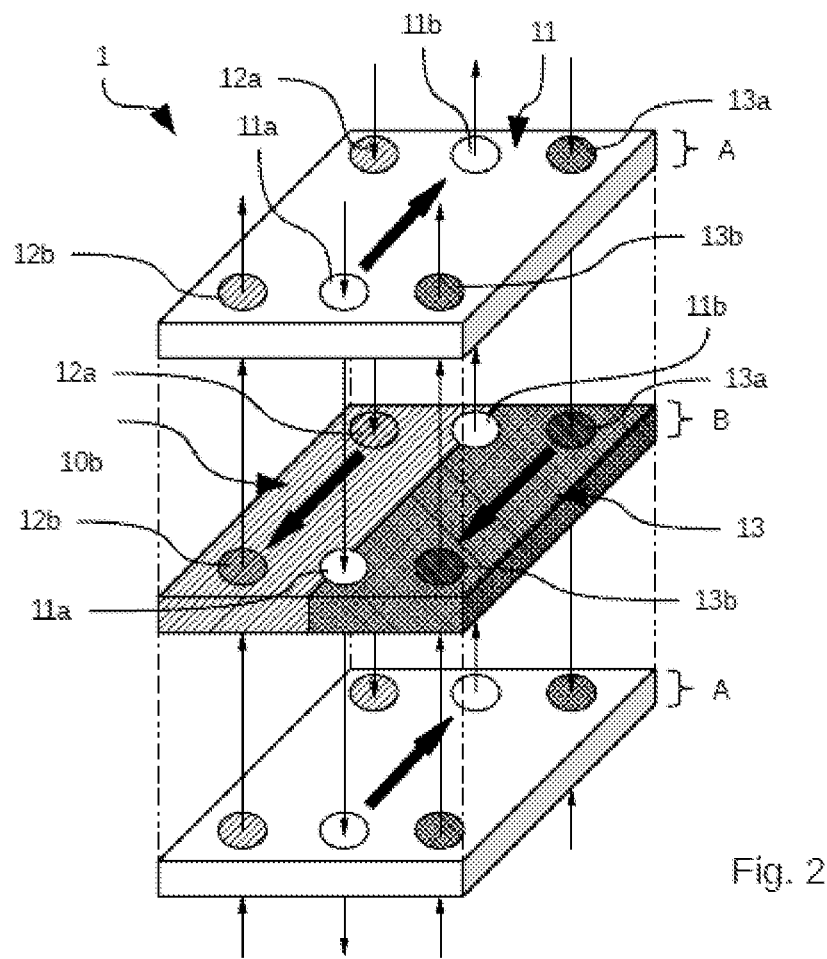
Figure 3:
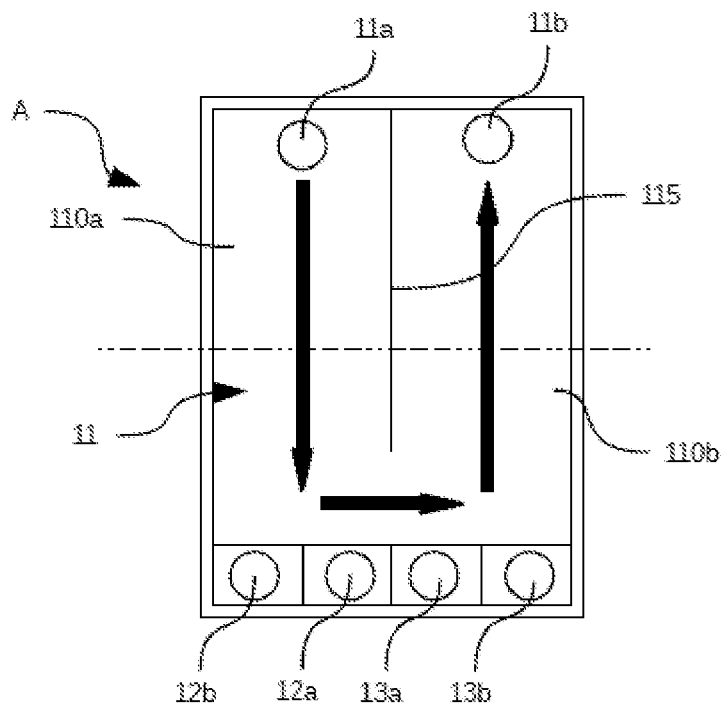
Figure 4:
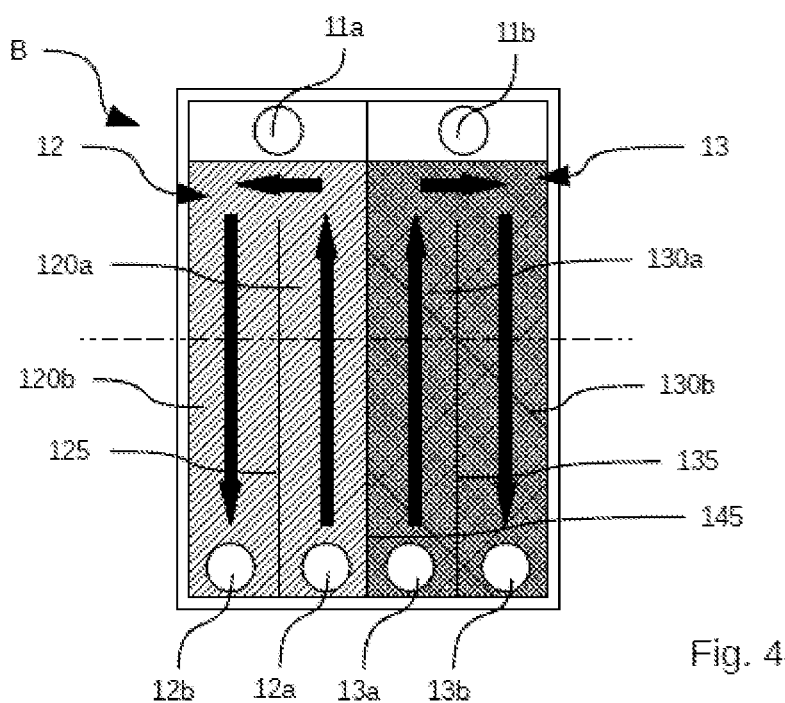
Figure 5:
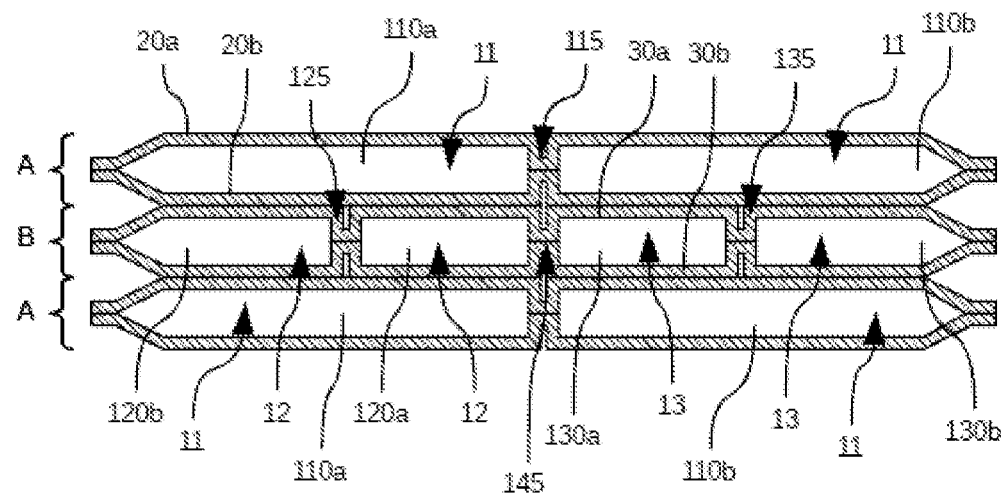
Figure 6:
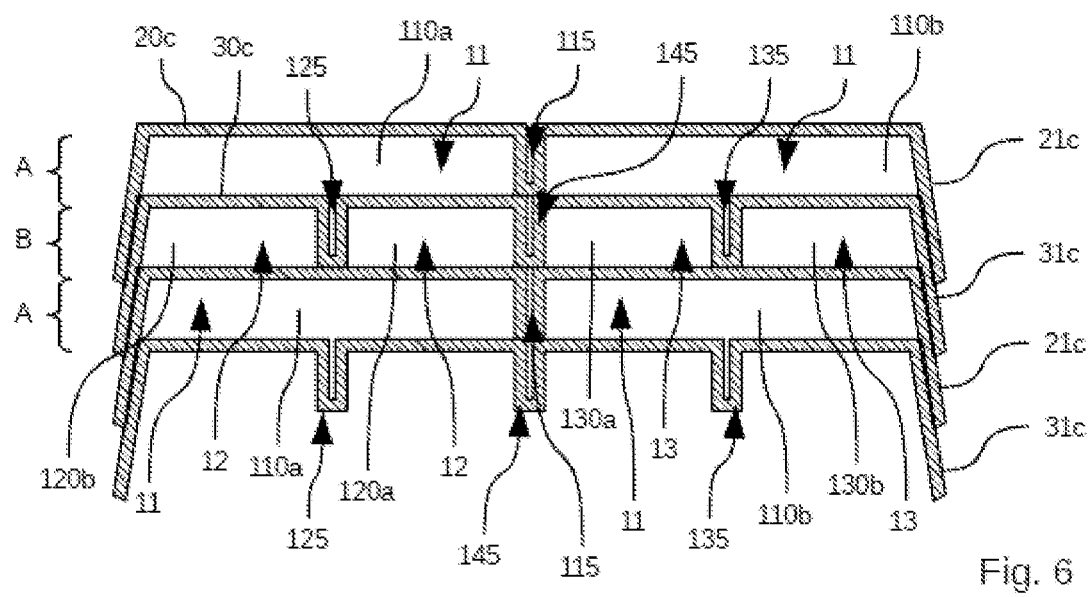
Figure 7:
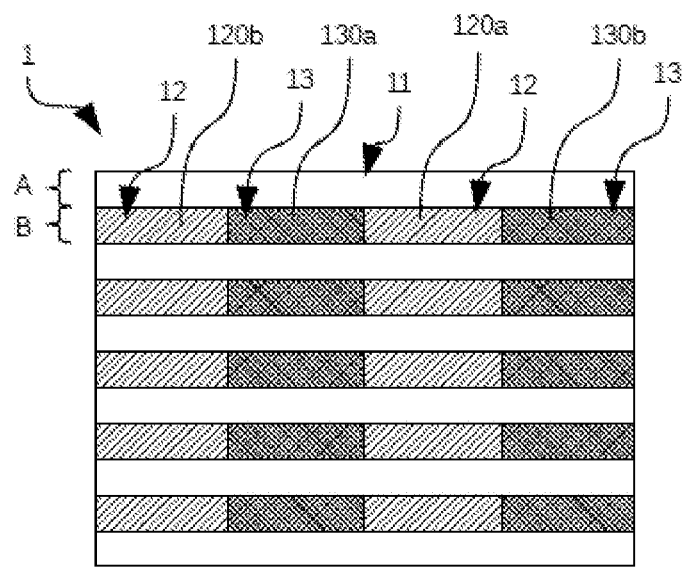
Figure 8:
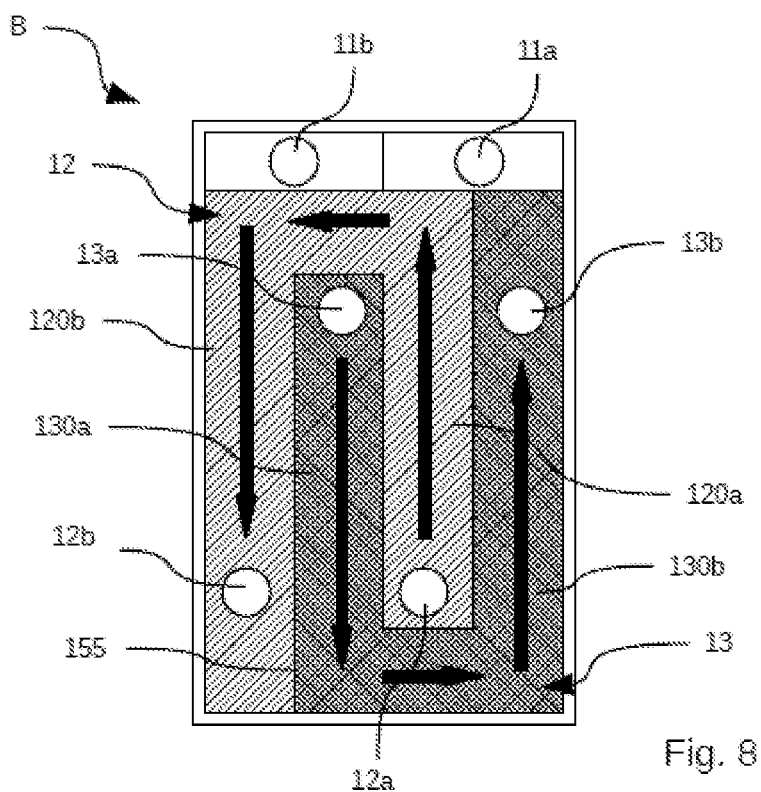
Figure 9:
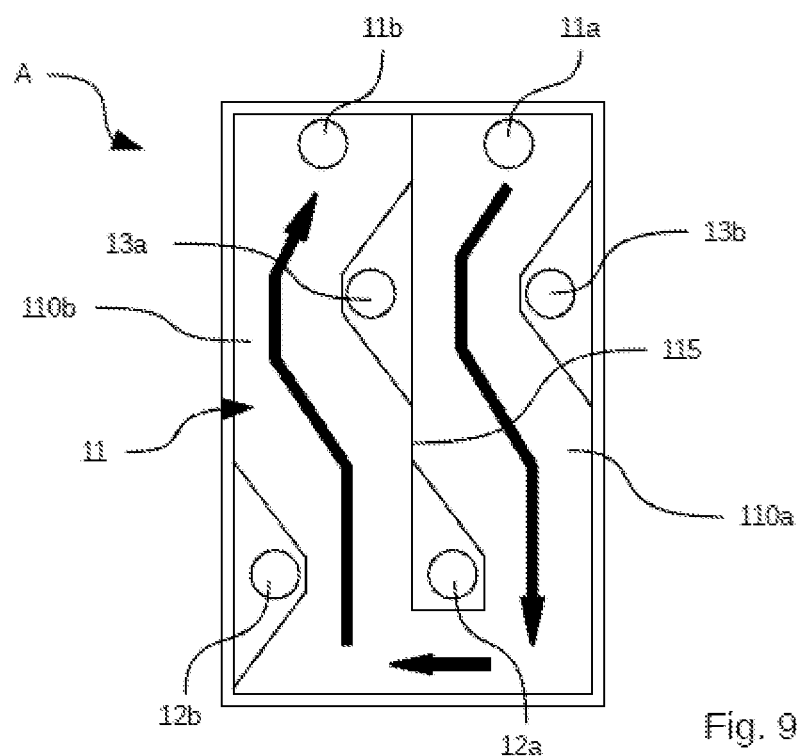

Further features and advantages of the present invention will become more clearly apparent from reading the following description, which is provided by way of non-limiting illustration, and with reference to the accompanying drawings, in which:

FIG. 1 is a schematic sectional representation of a three-fluid heat exchanger according to a first embodiment, FIG. 2 is a schematic exploded perspective representation of a three-fluid heat exchanger, FIG. 3 is a schematic representation viewed from above of a first circulation space according to the first embodiment, FIG. 4 is a schematic representation viewed from above of a second circulation space according to the first embodiment, FIG. 5 is a schematic sectional representation of the first and second circulation spaces according to a first variant, FIG. 6 is a schematic sectional representation of the first and second circulation spaces according to a second variant, FIG. 7 is a schematic sectional representation of a three-fluid heat exchanger according to a second embodiment, FIG. 8 is a schematic representation viewed from above of a first circulation space according to the second embodiment, FIG. 9 is a schematic representation viewed from above of a second circulation space according to the second embodiment.

In the various figures, identical elements bear the same reference numbers.

The following embodiments are examples. Although the description refers to one or more embodiments, this does not necessarily mean that each reference relates to the same embodiment, or that the features apply only to a single embodiment. Individual features of different embodiments may also be combined and/or interchanged in order to provide other embodiments.

In the present description, some elements or parameters may be indexed, such as, for example, a first element or a second element and a first parameter and a second parameter or even a first criterion and a second criterion, etc. In this case, this is simply indexing for differentiating and denominating elements or parameters or criteria that are similar but not identical. This indexing does not imply a priority of one element, parameter or criterion over another and such denominations may be easily interchanged without departing from the scope of the present description. This indexing also does not imply an order in time, for example, for assessing such or such a criterion.

FIGS. 1 and 2 show a three-fluid heat exchanger 1 shown schematically in section and in exploded perspective, respectively. This three-fluid heat exchanger 1 comprises a stack of plates 20a, 20b, 20c, 30a, 30b, 30c (visible in FIGS. 5 and 6) forming an alternation of first A and second B circulation spaces for the circulation of heat-transfer fluid, stacked in the direction of stacking of plates 20a, 20b, 20c, 30a, 30b, 30c. The three-fluid heat exchanger 1 also comprises a first circuit 11 for the circulation of a first heat-transfer fluid between a first inlet manifold 11*a* and a first outlet manifold 11*b* for the first heat-transfer fluid. The three-fluid heat exchanger 1 further comprises a second circuit 12 for the circulation of a second heat-transfer fluid between a second inlet manifold 12*a* and a second outlet manifold 12*b* for the second heat-transfer fluid. The three-fluid heat exchanger 1 additionally comprises a third circuit 13 for the circulation of a third heat-transfer fluid between a third inlet manifold 13*a* and a third outlet manifold 13*b* for the third heat-transfer fluid.

The first heat-transfer fluid may, for example, be a refrigerant fluid used within an air-conditioning circuit such as, for example, $CO_2$, R134a or R1234y. The second heat-transfer fluid may be glycol water circulating in a thermal management circuit, for example for the batteries of an electric or hybrid vehicle. The third heat-transfer fluid may also be a heat-transfer fluid such as glycol water circulating in another thermal management circuit.

The first circulation circuit 11 is arranged within the first circulation spaces A and the second 12 and third 13 circulation circuits are jointly arranged within the second circulation spaces B. As a result, the second 12 and third 13 circulation circuits do not take up a circulation space A or B each and each may allow heat energy to be exchanged with the first circulation circuit 11. The size of the heat exchanger 1 may thus be limited.

In the example of FIG. 2, the circulation circuits 11, 12, 13 comprise a single pass per circulation space A, B. However, the circulation circuits 11, 12, 13 may each comprise at least two passes within one and the same circulation space A, B in order to improve the efficiency of heat exchange between the first heat-transfer fluid and the second and third heat-transfer fluids.

FIGS. 3 and 4 show a first embodiment of the first A and second B circulation spaces comprising at least two passes. FIG. 3 more particularly shows a representation of the first circulation circuit 11 within the first circulation space A. The first circulation circuit 11 comprises a first pass 110*a* starting from the first inlet manifold 11*a* and crossing the first circulation space A lengthwise. The first circulation circuit 11 comprises a second pass 110*b* connected to the end of the first pass 110*a* opposite the first inlet manifold 11*a*. This second pass 110*b* crosses the first circulation space A lengthwise and meets the second inlet manifold 11*b*. The first 110*a* and second 110*b* passes are side by side and separated by a wall 115.

The first manifolds 11*a* and 11*b* are arranged on the same side of the first circulation space A. The second 12*a*, 12*b* and third 13*a*, 13*b* manifolds pass right through the first circulation space A and are isolated such that they cannot be in fluidic communication with the first circulation circuit 11 or with one another. In the example illustrated in FIG. 3, the second 12*a*, 12*b* and third 13*a*, 13*b* manifolds are aligned and arranged in the first circulation space A opposite the first manifolds 11*a*, 11*b*.

FIG. 4 shows a representation of the second 12 and third 13 circulation circuits within the second circulation space B. The second circulation circuit 12 comprises a first pass 120*a* starting from the second inlet manifold 12*a* and crossing the second circulation space B lengthwise. The second circulation circuit 12 comprises a second pass 120*b* connected to the end of the first pass 120*a* opposite the second inlet manifold 12*a*. This second pass 120*b* crosses the second circulation space B lengthwise and meets the second inlet manifold 12*b*. The first 120*a* and second 120*b* passes are side by side and separated by a wall 125.

The third circulation circuit 13 comprises a first pass 130*a* starting from the third inlet manifold 13*a* and crossing the second circulation space B lengthwise. The third circulation circuit 13 comprises a second pass 130*b* connected to the end of the first pass 130*a* opposite the third inlet manifold 13*a*. This second pass 130*b* crosses the second circulation space B lengthwise and meets the second inlet manifold 13*b*. The first 130*a* and second 130*b* passes are side by side and separated by a wall 135.

Within the second circulation spaces B, the second 12 and third 13 circulation circuits are arranged side by side such that the second circulation circuit 12 is arranged vertically in line with a first pass 110*a* of the first circulation circuit 11 and the third circulation circuit 13 is arranged vertically in line with a second pass 110*b* of the first circulation circuit 11. The second 12 and third 13 circulation circuits are separated by another wall 145.

The second and third manifolds 12*a*, 12*b*, 13*a* and 13*b* are arranged on the same side of the second circulation space B. The first manifolds 11*a*, 11*b* pass right through the second circulation space B and are isolated such that they cannot be in fluidic communication with the second 12 and third 13 circulation circuits or with one another. In the example illustrated in FIG. 4, the second 12*a*, 12*b* and third 13*a*, 13*b* manifolds are aligned and arranged in the second circulation space B opposite the first manifolds 11*a*, 11*b*.

FIGS. 5 and 6 show a cross-sectional view of the circulation spaces A and B. According to a first variant of the plates 20*a*, 20*b*, 30*a*, 30*b* illustrated in FIG. 5, each circulation space A, B comprises a first 20*a*, 30*a* and a second 20*b*, 30*b* plates adjoining one another, defining said circulation space A, B. The first circulation space A may be formed by a first 20*a* and a second 20*b* plates. Likewise, the second circulation space B may be formed by a first 30*a* and a second 30*b* plates. In the stack, the second plate 20*b*, 30*b* of a circulation space A, B is in contact with the first plate 20*a*, 30*a* of the adjacent circulation space A, B and vice versa. The walls 115, 125, 135 and 145 may be ribs made on the plates 20*a*, 20*b*, 30*a* and 30*b* and configured to define the path of the passes 110*a*, 110*b*, 120*a*, 120*b*, 130*a*, 130*b*.

According to a second variant of the plates 20*c*, 30*c* illustrated in FIG. 6, said plates 20*c*, 30*c* may have a curved profile with lateral edges 21*c*, 31*c*. The plates 20*c*, 30*c* are fitted into one another and the lateral edges 21*c*, 31*c* of two adjacent plates 20*c*, 30*c* overlap so as to form the circulation spaces A, B. As before, the walls 115, 125, 135 and 145 may be ribs made on the plates 20*c* and 30*c* and configured to define the path of the passes 110*a*, 110*b*, 120*a*, 120*b*, 130*a*, 130*b*.

FIGS. 7 to 9 show a second embodiment of the first A and second B circulation spaces comprising at least two passes. For this second embodiment, the circulation spaces A, B may be formed by two plates 20*a*, 20*b*, 30*a*, 30*b* or even a single plate 20*c*, 30*c* as described above.

As illustrated in FIGS. 7 and 8, within the second circulation spaces B, the second 12 and third 13 circulation circuits are not arranged side by side but are intermeshed such that a pass 110*a*, 110*b* of the first circulation circuit 11 is arranged simultaneously vertically in line with a pass 120*a*, 120*b*, 130*a*, 130*b* of the second 12 and the third 13 circulation circuits. For this, one of the passes 130*a*, 130*b* of the third circulation circuit 13 is arranged between the first 120*a* and second 120*b* passes of the second circulation circuit 13. The various passes 120*a*, 130*a*, 120*b* and 130*b* may thus be separated by a single wall 155 forming a zigzag-shaped path in the second circulation space B. This wall 155 may, as before, be a rib made on the one or more plates 30a, 30b, 30c forming the second circulation space B. The second manifolds 12a, 12b are here no longer aligned with the third manifolds 13a, 13b but are offset due to the intermeshing of the passes 120a, 120b, 130a, 130b. The first manifolds 11a, 11b pass right through the second circulation space B and are isolated such that they cannot be in fluidic communication with the second 12 and third 13 circulation circuits or with one another.

As illustrated in FIG. 9, the first circulation space A remains the same as the first embodiment except that the second 12a, 12b and third 13a, 13b manifolds are arranged at different locations. As a result, the passes 110a and 110b have a less straight path than in the first embodiment and instead a more winding path due to the locations of the second 12a, 12b and third 13a, 13b manifolds.

In order to improve heat exchange, the circulation of the first heat-transfer fluid in the first circulation spaces A may flow countercurrent to the circulation of the second and third heat-transfer fluids in the second circulation spaces B. For this, the first pass 110a of the first circulation circuit 11 may be arranged vertically in line with the second pass 120b of the second circulation circuit 12 and with the first pass 130a of the third circulation circuit 13. The second pass 110b of the first circulation circuit 11 may be arranged vertically in line with the first pass 120a of the second circulation circuit 12 and with the second pass 130b of the third circulation circuit 13.

Thus, it is clear that the second 12 and third 13 circulation circuits being arranged in the same circulation space allows the size of the three-fluid heat exchanger 1 to be improved.

The invention claimed is:

1. A three-fluid heat exchanger comprising:
   a stack of plates;
   a first circuit for circulation of a first heat-transfer fluid between a first inlet manifold and a first outlet manifold for the first heat-transfer fluid;
   a second circuit for the circulation of a second heat-transfer fluid between a second inlet manifold and a second outlet manifold for the second heat-transfer fluid, and
   a third circuit for the circulation of a third heat-transfer fluid between a third inlet manifold and a third outlet manifold for the third heat-transfer fluid,
   wherein the stack of plates forms an alternation of first and second circulation spaces for the circulation of the first heat-transfer fluid, the second heat-transfer fluid, and the third heat-transfer fluid, such that the alternation of the first circulation space and the second circulation space is stacked in a direction of stacking of plates, the first circuit being arranged within the first circulation spaces and the second and third circuits being jointly arranged within the second circulation spaces;
   wherein the first circulation circuit comprises at least two passes within the first circulation space;
   wherein the second and third circulation circuits each comprise at least two passes within the second circulation space,
   wherein the second circulation circuit has a U-shape connecting the second inlet manifold and the second outlet manifold,
   wherein the third circulation circuit has a U-shape connecting the third inlet manifold and the third outlet manifold, and
   wherein the first heat-transfer fluid comprises a refrigerant, the second heat-transfer fluid comprises a first glycol water fluid, and the third heat-transfer fluid comprises a second glycol water fluid.

2. The three-fluid heat exchanger as claimed in claim 1, wherein within the second circulation spaces, the second and third circulation circuits are arranged side by side such that the second circulation circuit is arranged vertically in line with a first pass of the first circulation circuit and the third circulation circuit is arranged vertically in line with a second pass of the first circulation circuit, wherein the second circulation circuit and the third circulation circuits are fluidly separated by a straight wall.

3. The three-fluid heat exchanger as claimed in claim 1, wherein within the second circulation spaces, the second and third circulation circuits are intermeshed such that a pass of the first circulation circuit is arranged simultaneously vertically in line with a pass of the second and of the third circulation circuits.

4. The three-fluid heat exchanger as claimed in claim 3, wherein the circulation of the first heat-transfer fluid in the first circulation spaces flows countercurrent to the circulation of the second and third heat-transfer fluids in the second circulation spaces.

5. The three-fluid heat exchanger as claimed in claim 1, wherein the plates comprise at least one rib configured to define a path of the passes.

6. The three-fluid heat exchanger as claimed in claim 1, wherein each circulation space comprises a first and a second plates adjoining one another, defining each circulation space, in the stack, the second plate of a circulation space being in contact with the first plate of an adjacent circulation space and vice versa.

7. The three-fluid heat exchanger as claimed in claim 1, wherein the plates have a curved profile with lateral edges, the plates being fitted into one another, the lateral edges of two adjacent plates overlapping so as to form the circulation spaces.

8. The three-fluid heat exchanger as claimed in claim 1, wherein the refrigerant is selected from a group comprising: $CO_2$, R134a, and R1234y.

9. The three-fluid heat exchanger as claimed in claim 1, wherein the first circulation circuit has a U-shape connecting the first inlet manifold and the first outlet manifold.

10. The three-fluid heat exchanger as claimed in claim 1, wherein:
   the plates have a substantially rectangular shape,
   the second inlet manifold and second outlet manifold in the first and second circulation spaces are aligned parallelly to a first dimension of the substantially rectangular shape, and
   the third inlet manifold and third outlet manifold in the first and second circulation spaces are aligned parallelly to the first dimension.

11. The three-fluid heat exchanger as claimed in claim 10, wherein the first inlet manifold and first outlet manifold in the first and second circulation spaces are aligned parallelly to the first dimension.

12. The three-fluid heat exchanger as claimed in claim 10, wherein the second inlet manifold, second outlet manifold, third inlet manifold and third outlet manifold are aligned in the first and second circulation spaces.

13. The three-fluid heat exchanger as claimed in claim 12, wherein:
   the second inlet manifold, second outlet manifold, third inlet manifold and third outlet manifold are located on a same first side of the substantially rectangular shape, and the first inlet manifold and first outlet manifold are located on a same second side of the substantially rectangular shape, the second side opposite the first side.

14. The three-fluid heat exchanger as claimed in claim 13, wherein the first inlet manifold and first outlet manifold in the first and second circulation spaces are aligned parallelly to the first dimension.

* * * * *